(12) United States Patent
Gerken et al.

(10) Patent No.: US 8,192,609 B2
(45) Date of Patent: Jun. 5, 2012

(54) COBALT OXYFLUORIDE CATALYSTS FOR ELECTROLYTIC DISSOCIATION OF WATER

(75) Inventors: James B. Gerken, Madison, WI (US); Shannon S. Stahl, Madison, WI (US)

(73) Assignee: Wisconsin Alumni Research Foundation, Madison, WI (US)

( * ) Notice: Subject to any disclaimer, the term of this patent is extended or adjusted under 35 U.S.C. 154(b) by 380 days.

(21) Appl. No.: 12/628,464

(22) Filed: Dec. 1, 2009

(65) Prior Publication Data
US 2011/0127170 A1 Jun. 2, 2011

(51) Int. Cl.
*C25B 1/02* (2006.01)
*C25B 11/04* (2006.01)
*C25B 11/06* (2006.01)
*C25B 11/00* (2006.01)
*C25D 9/00* (2006.01)
*C25D 11/00* (2006.01)

(52) U.S. Cl. .................. 205/630; 204/290.01; 205/316; 205/333; 205/632

(58) Field of Classification Search .......... 205/628–639, 205/333, 255; 204/279–280, 290.01–290.15
See application file for complete search history.

(56) References Cited

U.S. PATENT DOCUMENTS

| | | |
|---|---|---|
| 3,399,966 A | 9/1968 | Suzuki et al. |
| 4,142,005 A | 2/1979 | Caldwell et al. |
| 2001/0050234 A1 | 12/2001 | Shiepe |
| 2002/0005360 A1 | 1/2002 | Haug et al. |
| 2006/0293173 A1 | 12/2006 | Zhang et al. |
| 2008/0173540 A1 | 7/2008 | Ashok et al. |
| 2010/0101955 A1 | 4/2010 | Nocera et al. |
| 2010/0133111 A1 | 6/2010 | Nocera et al. |

FOREIGN PATENT DOCUMENTS
WO WO 2005/090643 9/2005

OTHER PUBLICATIONS

G. Seshadri et al., A New Homogeneous Electrocatalyst for the Reduction of Carbon Dioxide . . . , 372 Journal of Electroanalytical Chemistry 145-150 (1994).
A. Kuhn et al., Electrolytic Oxidation of Chromium Salts, 26 J. Appl. Chem. Biotechnol. 407-418 (1976).
N. Bailey et al., Structure and Reactivity . . . , (1960).
E. Cole et al., Using a One-Electron Shuttle . . . , 132 J. Am. Chem. Soc. 11539-11551 (2010).
A. Robertson, Promoter Action in Homogenous Catalysis . . . , (1926).
A. Kappanna et al., Anodic Reactions in the Electrolysis of Acid-Cobalt-Fluoride, 18 Current Science 27 (1958).
B. Cox et al., Complex Fluorides . . . , J. Chem. Soc. 1798-1803 (1954).
M. Meyers et al., The Preparation, Structures . . . 82 J. Am. Chem. Soc. 5027-5030 (1960).
T. Court et al., Solution Chemistry of Cobalt in Liquid Hydrogen Fluoride, 6 J. Fluorine Chem. 491-498 (1975).

(Continued)

*Primary Examiner* — Mark F Huff
*Assistant Examiner* — Brian W Cohen
(74) *Attorney, Agent, or Firm* — Quarles & Brady LLP (57) ABSTRACT

Disclosed are electrolysis catalysts formed from cobalt, oxygen and fluoride. They can be formed as a coating on an anode by conducting an electrolysis reaction using an electrolyte containing cobalt and fluoride. The catalysts will facilitate the conversion of water to hydrogen gas and oxygen gas, even at pH neutral/room temperature reaction conditions. The resulting hydrogen gas is a means of storing renewable energy for use in hydrogen powered vehicles or the like.

7 Claims, 6 Drawing Sheets

OTHER PUBLICATIONS

M. Kanan et al., In Situ Formation of an Oxygen-Evolving Catalyst in Neutral Water Containing Phosphate and Co2+, 321 Science 1072-1075 (2008).

Y. Surendranath et al., Electrolye-Dependent . . . , 131 J. Am. Chem. Soc. 2615-2620 (2009).

H. Priest, Anhydrous Metal Fluorides, 3 Inorg. Syn. 171-183 (1950).

V. Ustinov et al., Separation of Oxygen Isotopes in the Fluorination of Oxygen-containing Compounds, 52 Zh. Fiz. Khim. 344-347 (1978).

V. Klemm et al., Uber Fluorocobaltate(III) und -(IV) und Fluoronic-colate(III), 308 Anorg. Allg. Chem. 179-189 (1961).

8 pages of an ISR from corresponding PCT application PCT/US2010/058150 dated Aug. 31, 2011.

COBALT OXYFLUORIDE CATALYSTS FOR ELECTROLYTIC DISSOCIATION OF WATER

STATEMENT REGARDING FEDERALLY SPONSORED RESEARCH/DEVELOPMENT

This invention was made with government support under 0802907 awarded by the National Science Foundation. The government has certain rights in this invention.

CROSS-REFERENCE TO RELATED APPLICATIONS

Not applicable.

BACKGROUND OF THE INVENTION

The present invention relates to catalysts useful to form portions of electrolysis anodes. More particularly it relates to a cobalt/oxygen/fluorine based catalyst suitable to facilitate water electrolysis.

Figure 1:
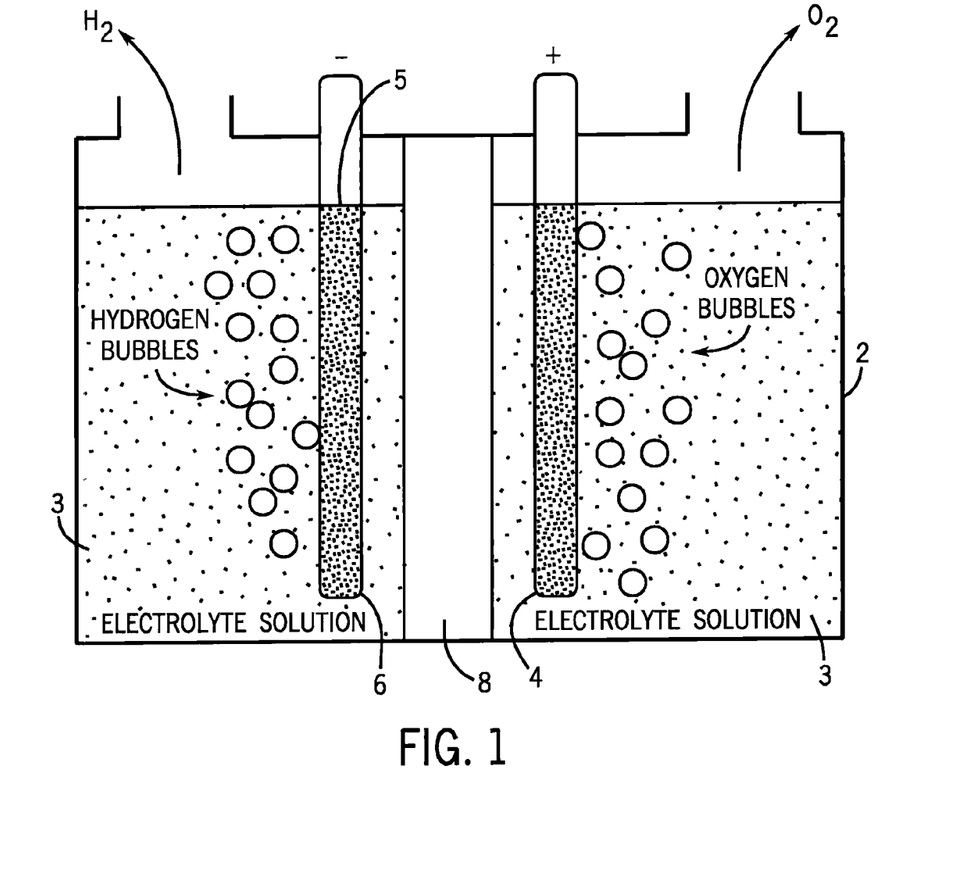
FIG. 1 schematically depicts a prior art system for conducting electrolysis of water.

The search for compositions to catalyze electrolysis of water is primarily currently driven by the desire to store renewable energy (e.g. solar or wind energy) in the form of hydrogen gas, with the hydrogen gas then becoming a more practical substitute for fossil fuels in applications such as automobiles. FIG. 1 depicts schematically a prior art water electrolysis system. A container 2 stores an aqueous solution 3. An anode 4 and a cathode 6 are positioned in a water based electrolyte solution and then linked to a current source (not shown). A diaphragm isolates the gases developed by splitting water into its constituent gases.

This prior art technology generates hydrogen (and oxygen). However, it does so in such an energy inefficient manner so as to render the process commercially impractical as a means of converting solar energy or the like to hydrogen gas fuel. In this regard, the electrolytic gas production involves transfer of four protons and four electrons with the formation of an oxygen-oxygen bond at the anode concomitant with reduction of protons to produce hydrogen at the cathode. A substantial amount of energy to drive that reaction must be provided over the theoretical minimums required (the "overpotential").

Efforts have been made to try to reduce the amount of overpotential needed to drive the reaction by using specialized anodes and/or a catalyst. This has helped somewhat. However, there are still significant commercial impediments to implementing their use.

For example, some catalysts degrade under the reaction conditions required. Others are not widely available at reasonable cost, or do not reduce the required overpotential sufficiently.

Some cobalt oxide materials have been tried as water-electrolysis catalysts in hydroxide electrolyte systems. These consist of $Co^{III}$ oxide clusters which are active in strongly basic media. They appear to proceed via a process involving $Co^{II}$, $Co^{III}$, and $Co^{IV}$-oxo species. These require highly basic conditions to efficiently function, as hydroxide is both the electrolyte and buffer, and must operate at elevated temperatures for optimal efficiency.

Also, in U.S. Pat. No. 3,399,966 there was a disclosure of a cobalt oxide coating on an electrolysis anode, used in one example with fluoborate electrolyte. However, this did not adequately address the overpotential concern.

In unrelated work it is known that $CoF_3$ and fluorocobaltate$^{III}$ salts react with water to liberate oxygen and HF. See H. Priest, Anhydrous metal Fluorides, 3 Inorg. Syn. 171-183 (1950); V. Ustinov et al., Separation Of Oxygen Isotopes In The Fluorination Of Oxygen-containing Compounds, 52 Z h. Fiz. Khim. 344-347 (1978); V. Klemm et al., Uber Fluorocobaltate(III) und-(IV) und Fluoroniccolate(III), 308 Anorg. Allg. Chem. 179-189 (1961).

Further, there have been some attempts to describe aqueous solutions containing both cobalt and fluoride ions in the context of electrochemical studies. See A. Kappanna et al., Anodic Reactions In The Electrolysis Of Acid-Cobalt-Fluoride, 18 Current Science 27 (1958); B. Cox et al., Complex Fluorides . . . , J. Chem. Soc. 1798-1803 (1954); M. Meyers et al. The Preparation, Structures . . . , 82 J. Am. Chem. Soc. 5027-5030 (1960); and T. Court et al., Solution Chemistry Of Cobalt In Liquid Hydrogen Fluoride, 6 J. Fluorine Chem. 491-498 (1975).

The production of a water oxidation catalyst by electrolysis of solutions of $Co^{2+}$ salts in aqueous phosphate, borate, and methylphosphonate buffers has also recently been reported. M. Kanan et al., In Situ Formation Of An Oxygen-Evolving Catalyst In Neutral Water Containing Phosphate And $Co^{2+}$, 321 Science 1072-1075 (2008); and Y. Surendranath et al., Electrolyte-Dependent Electrosynthesis . . . , 131 J. Am. Chem. Soc. 2615-2620 (2009). However, the required overpotential at useful current densities is a significant impediment to commercial application.

Hence, there still is a need for more efficient catalysts for converting water to hydrogen and oxygen in electrolysis reactions.

SUMMARY OF THE INVENTION

In one aspect the invention provides a method for generating a gas selected from the group of hydrogen and oxygen via an electrolysis reaction. One places an anode and a cathode in aqueous solution. At least a portion of the aqueous solution adjacent the anode comprises water, cobalt cation and fluoride anion. Using an external source of electricity one then drives the electrolysis reaction from the anode and cathode. The gas is thereby generated (e.g. typically hydrogen at the cathode and oxygen at the anode). In one form essentially simultaneously with the generation of the gas a catalyst comprising cobalt, oxygen and fluorine is deposited on the anode.

In an especially preferred form the aqueous solution adjacent the anode has a pH of between 3 and 7 (e.g. around 3.5), the cobalt cation is present in the aqueous solution adjacent the anode at a concentration of between 0.1 and 100 mM (most preferably around 1 mM), and the fluoride anion is present in the aqueous solution adjacent the anode at a concentration between 0.1 and 2 M (most preferably around 1.0 M).

In another aspect the invention provides an alternative method for generating a gas selected from the group of hydrogen and oxygen from water via an electrolysis reaction. One places an anode and a cathode in water (preferably with a fluoride electrolyte). The anode comprises a substrate coated with a catalyst, the catalyst comprising cobalt, oxygen and fluorine (preferably as fluoride). One then uses an external source of electricity to drive the electrolysis reaction from the anode and cathode. The gas is thereby generated.

The catalyst coating on the anode preferably has about two oxygens for each cobalt and the catalyst is about 5-9%, more preferably about 7%, fluorine as fluoride. For example, in one sample the ratios were Co:O:F at 4.24:8.9:1. While a variety of known anode materials suitable for use in electrolysis of water can be used for the substrate material, we prefer the substrate to be a tin oxide selected from the group consisting of indium tin oxide and fluorine tin oxide.

In yet another aspect the invention provides an anode suitable for generating oxygen in an electrolysis reaction. The anode has a substrate. There is a catalytic coating over the substrate which comprises cobalt, oxygen and fluorine, with the catalyst comprising about two oxygens for each cobalt present in the catalyst.

Preferably this coating is formed by electrolytic film deposition of the catalyst on the substrate during an electrolysis reaction in which the substrate is positioned in an aqueous solution comprising cobalt cation and fluoride anion.

In a further form of the invention there is provided a method for forming such anodes. One positions such a substrate in an aqueous solution comprising cobalt cation and fluoride anion, and conducts an electrolysis reaction using the substrate as an initial anode in that reaction until the catalyst deposits on the substrate.

One can generate electricity using a renewable or other energy source (e.g. solar cell or wind turbine), use that electricity to drive the electrolysis reactions of the present invention, and collect the resulting hydrogen gas for use as an alternative fuel source for a vehicle or other device. The collected oxygen gas can be used for numerous other known purposes (e.g. enhancing oxygen content in room air in buildings).

The reaction can be conducted in a large scale production facility, or can be conducted via a residential size generation system. Using the latter approach homeowners could, for example, use energy generated by solar cells or wind turbines to create a way of refueling their automobiles.

The catalysts/anodes of the present invention function efficiently (with comparatively low overpotentials), without requiring highly basic reaction conditions, even at ambient room conditions. Further, they appear to be stable under the highly oxidizing conditions experienced by these reactions. Also, cobalt and fluoride are available in relatively high quantities, at relatively low cost. These factors are important in making such fuel generation systems more commercially practical.

The above and still other advantages of the present invention will be apparent from the description that follows. It should be appreciated that the following description is merely of preferred embodiments of our invention. The claims should therefore be looked to in order to understand the full claimed scope of the invention.

DESCRIPTION OF THE PREFERRED EMBODIMENTS

To create our electrolyte solution we add to water cobalt$^{++}$ cation at around 1 mM, such as by adding $CoSO_4$, $CoCl_2$, $Co(NO_3)_2$ or the like. We also add a fluoride anion at a concentration of about 0.1 M. We prefer providing the fluoride anion in the form of a pH buffered mixture of KF and HF. In our experiments with varied pHs the pH was adjusted by the addition of $KHF_2$ or NaOH as needed.

The cathode (6) can be any cathode suitable for use in water electrolysis under the conditions we are exposing the cathode to. Particularly preferred cathodes are platinum or platinized graphite cathodes.

The anode (4) begins with a substrate (5), which again can be any anode suitable for use in water electrolysis under the conditions we are exposing the anode to. Particularly preferred substrates for the anode are materials such as tin oxides, particularly indium tin oxide or fluorine tin oxide.

We cause electrolytic film deposition of our catalyst by operating the FIG. 1 device using the aforesaid electrolytic solution at about 1.48 volts (e.g. 1.33 volts to 1.58 volts). Once the anode has been coated with our catalyst, it is no longer critical that the electrolyte solution contain both the cobalt or fluoride. It could continue to be operated with fluoride.

Figure 2:
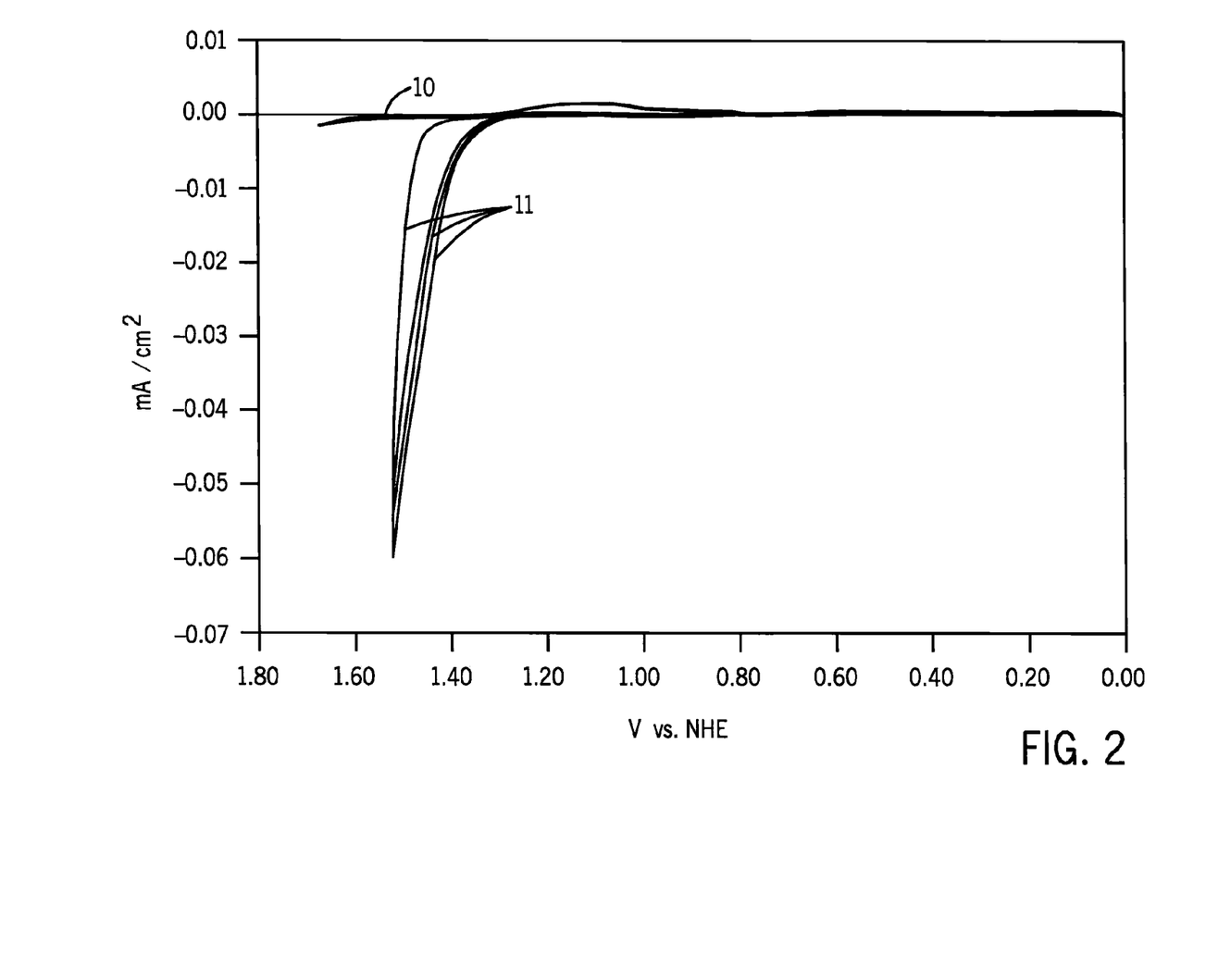
FIG. 2 compares the effect, in a FIG. 1 type system, of an electrolytic solution with no cobalt (10) with using the identical system with cobalt also added (11)

FIG. 2 depicts the results of cyclic voltammetry scans of an indium tin oxide substrate anode in 0.1 M KF electrolyte with and without 1 mM $CoSO_4$ at pH 5. The vertical axis is the log current density. The horizontal axis is voltage. In the presence of cobalt ions (11) there was an abrupt production of catalytic current. As the voltage is scanned back, there was a broad cathodic peak centered at $E_{p,c}=1.07$ V.

Figure 3:
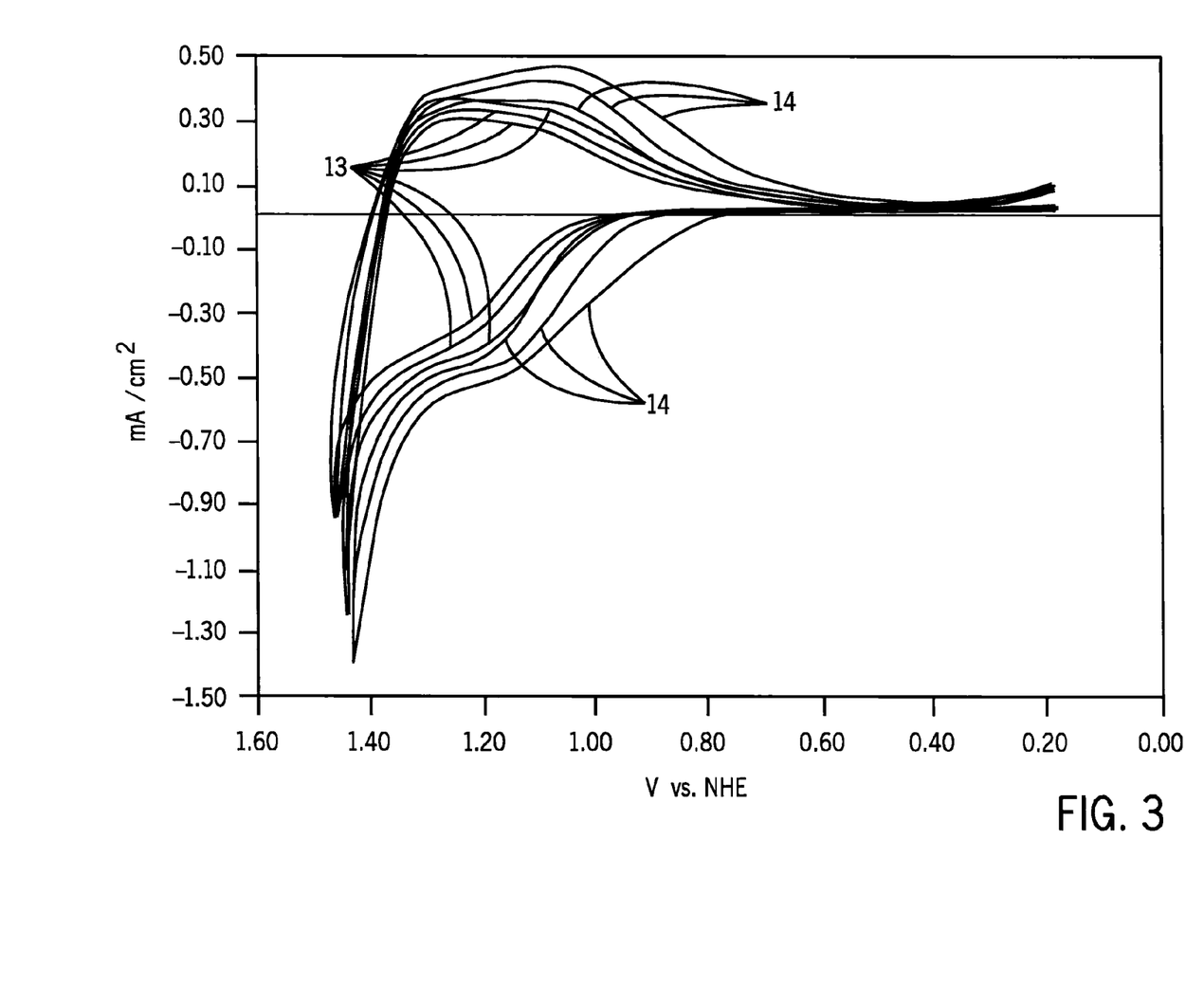
FIG. 3 shows comparative experiments taken after a catalyst coating from the (11) experiments has deposited on the anode, comparing the results of that (13), with the use of that coated catalyst anode in cobalt-free solution (14)

Subsequent to electrodeposition we ran the FIG. 3 experiments. Continued controlled-potential (CPE) electrolysis at 600s 1.48 V, in 0.1 M fluoride at pH 5 with 1 mM $CoSO_4$, and following a subsequent 600 s. CPE at 1.48 V in cobalt-containing buffer led to deposition of a film of material that showed increased catalytic current on subsequent cyclic voltammetric scans. These (13) experiments showed an anodic wave at ~1.2 V that blended into the catalytic current.

A subsequent cyclic voltammetric scan following rinsing of the electrode and electrolysis in fresh pH 5 fluoride buffer for 10 min at 1.48 V confirmed that even without cobalt in the electrolyte solution the coated anode retained essentially the same activity (14). Note that in our experiments the catalytic effect was noted unless the electrode is held at potentials more reducing than the cathodic wave at ~1 V, below which dissolution of the catalyst is observed.

Figure 4:
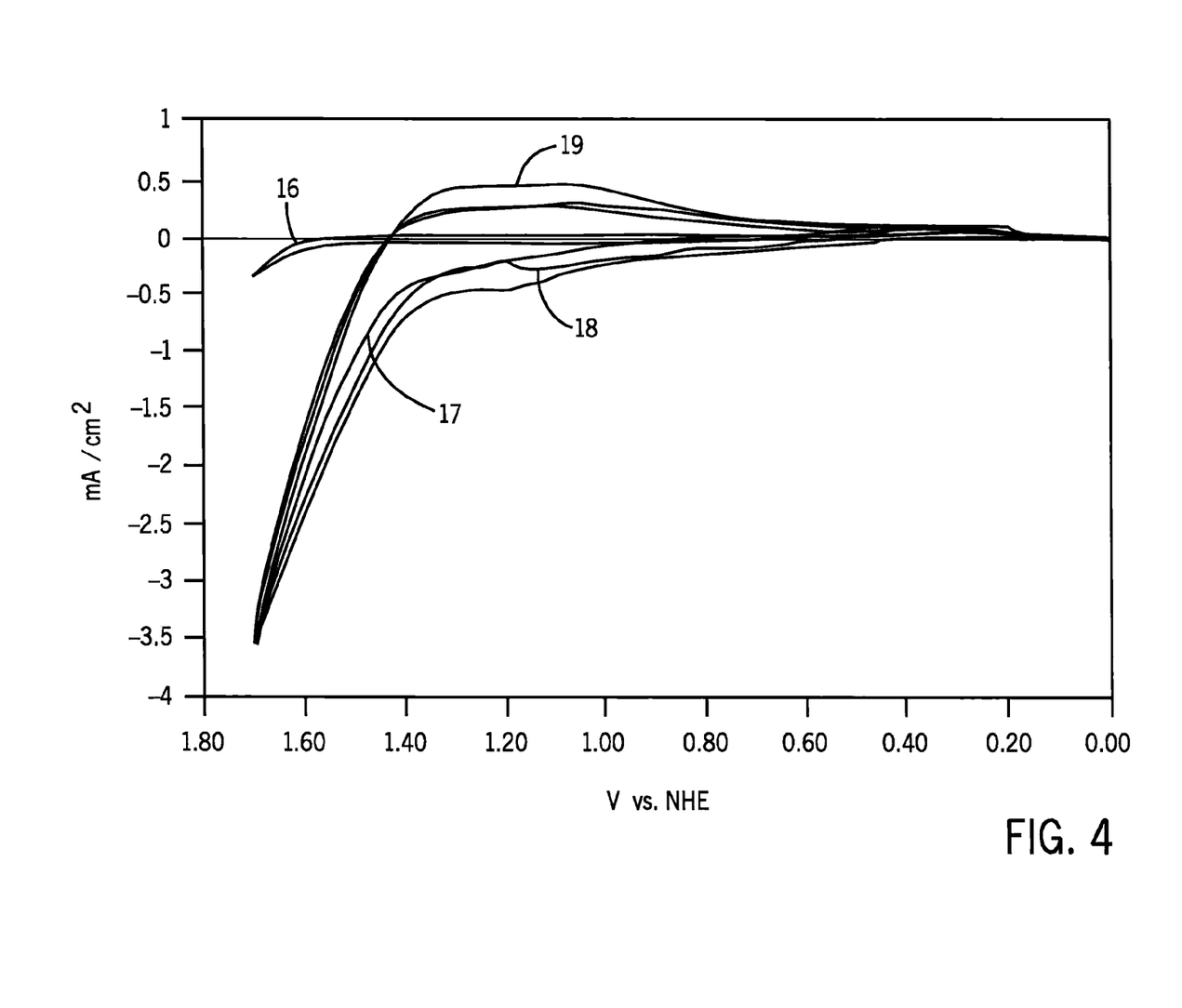
FIG. 4 shows similar experiments as with (13) at pH 3.0 (16), pH 4.5 (17), pH 5.5 (18) and pH 7.1 (19)

As depicted in FIG. 4, we then compared the effect of different pHs using a graphite anode. We found that even at pHs around neutral the catalytic effects are quite efficient.

Figure 5:
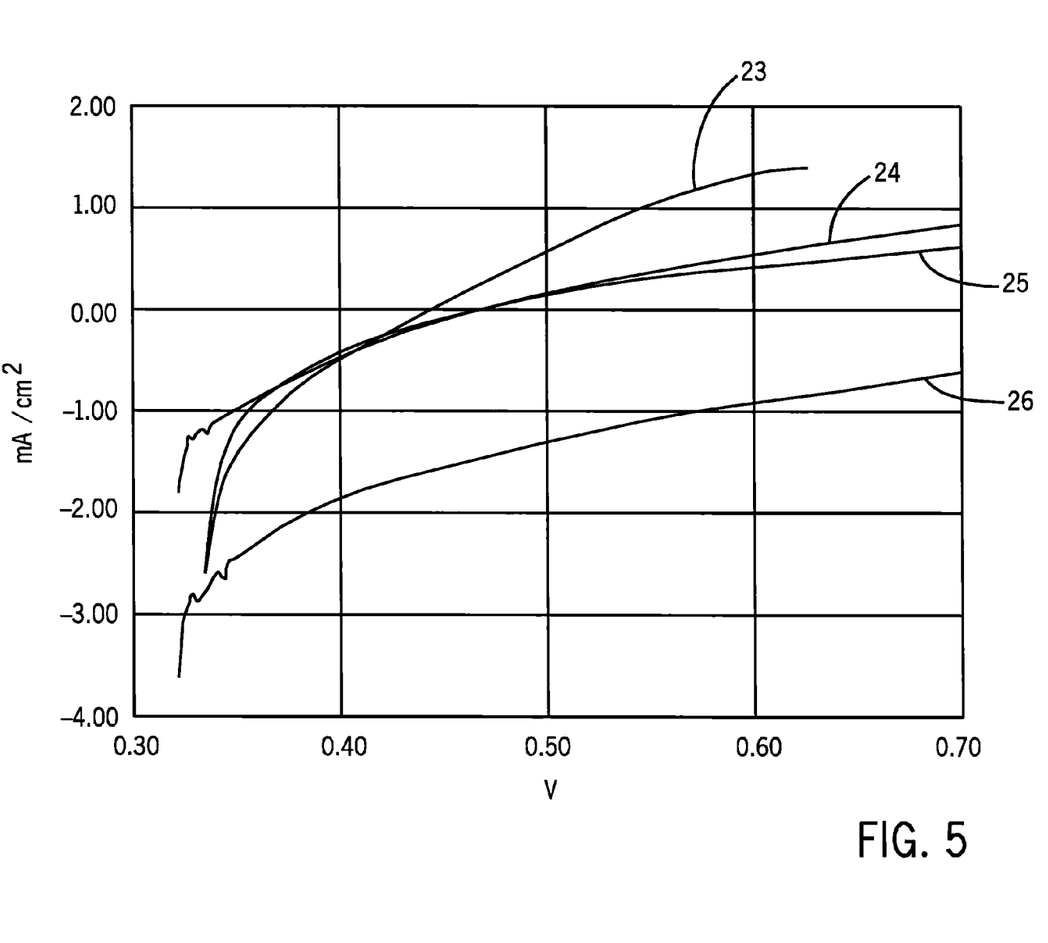
FIG. 5 shows similar experiments where the electrolyte contained fluoride at pH 3.5 (23/24), or contained phosphate at pH 7.0 (25/26)

We then sought to compare the efficiency of our catalyst with catalytic results using another anion besides fluoride, with cobalt. These experiments are depicted on FIG. 5. The FIG. 5 experiments confirm the superiority of the fluoride anion (23)/1 M or (24)/0.1 M versus phosphate (25) or (26) at those molarities. We compared the log of the current density versus overpotential.

Figure 6:
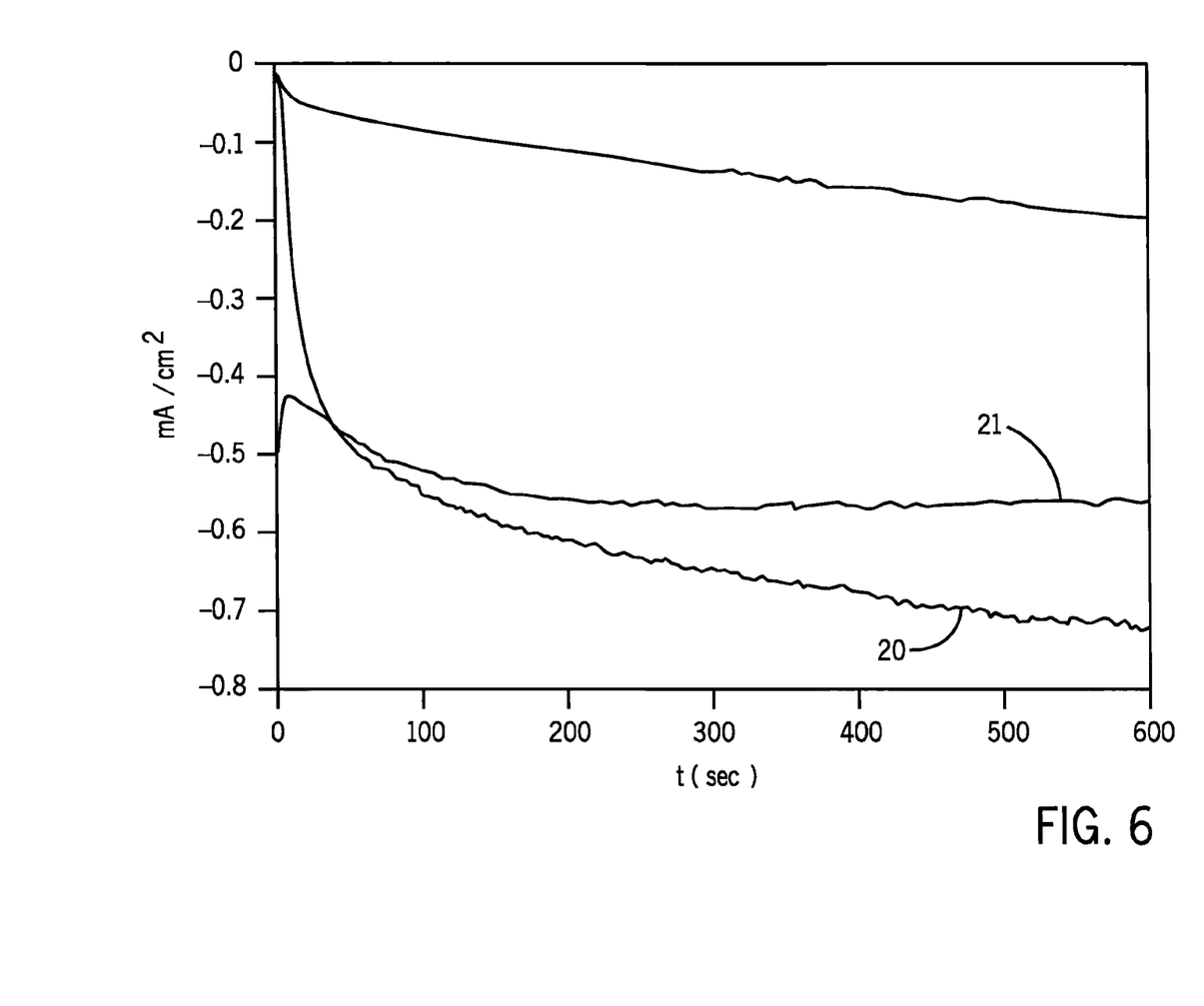
FIG. 6 compares current density versus time effects where the electrolyte contained fluoride (20), or contained phosphate (21).

We then ran an experiment involving constant-potential electrolyses of fluoride-buffered cobalt solutions in a stirred, undivided cell (without the diaphragm 8). These experiments were not focused on the collection of the gases. FIG. 6 experiments were run at an initial pH of 5, and showed the pattern of current increase reflecting deposition as graphed. With the increase in current there was formation of increased visible deposit on the electrode and bubbling. Fluoride results (20) were superior to phosphate (21), and vastly superior to sulfate.

In prolonged electrolyses in cobalt-free buffer at lower pH, we noted that there was a decrease in current over time. We attribute this to slight dissolution of the visible coating on the anode. This suggests that the pKa of HF is close to that of the solid. However, steady state is achieved at approximately 0.1 mM $Co^{++}$. Alternatively, increasing the fluoride concentration in the electrolyte solution after anode coating formation was found to lead to a more stable deposit.

One can generate hydrogen gas using our improved anode (along with oxygen at the cathode). An electrode prepared by the constant-potential deposition can be placed in 0.1 M neutral fluoride electrolyte, in a closed, divided cell like that of FIG. 1, and linked to a pressure transducer. The presence of gas generation at both the anode and cathode can be confirmed.

Further, we note that we ran some studies of the nature of the catalyst. We determined that it contains cobalt, oxygen, and fluorine, in about the ratio of one fluorine, to 4.24 cobalts, to about 8.9 oxygen. We believe that the fluorine is present as fluoride in the material. SEM images of the deposit show a layer of fused spherical nodules. The catalyst appears yellow-brown.

We believe that $F^-$ acts as a proton acceptor during oxidation of cluster sites bearing either a $Co(H_2O)$ or CoOH moiety en route to O—O bond formation, with either subsequent proton transfer to or exchange of the formed HF with $F^-$ in solution. The inability of catalytically competent deposits to form anywhere near as well in sulfate electrolyte solutions at low cobalt concentration suggests that $SO_4^{2-}$ is too weak of a base.

Our experiments with fluoride suggest that the fluoride is acting in some more complicated role than phosphate does. We believe that it is not just acting as a base. Fluoride can act as a ligand on cobalt, and fluoride is also a strong hydrogen-bond acceptor that may play a role in activating water molecules towards reaction with the catalytic center.

As cobalt oxyfluoride compounds are readily produced, we favor the explanation that a cobalt oxide cluster containing at least one fluoride ligand is formed to create the claimed catalyst, and that this undergoes exchange with water to form an aqua-complex which engages in electron-coupled proton transfer to outer-sphere fluoride to yield clusters containing a Co(O) species which produces the observed water oxidation.

While a number of embodiments of the present invention have been described above, the present invention is not limited to just these disclosed examples. There are other modifications that are meant to be within the scope of the invention and claims.

Thus, the claims should be looked to in order to judge the full scope of the invention.

Industrial Applicability

The present invention provides improved catalytic materials for use in water electrolysis, anodes which incorporate them, methods of forming them, and methods of generating a fuel and oxygen gas using them, thereby providing a more practical way of storing renewable energy.

We claim:

1. A method for generating a gas selected from the group of hydrogen and oxygen from water via an electrolysis reaction, comprising:
    placing an anode and a cathode in water;
    using an external source of electricity to drive the electrolysis reaction from the anode and cathode at a time when the anode comprises a substrate comprising a catalyst coating, the catalyst coating comprising cobalt, oxygen and fluorine;
    whereby the gas is thereby generated.

2. The method of claim 1, wherein the gas is both hydrogen and oxygen, hydrogen is generated at the cathode, and oxygen is generated at the anode.

3. The method of claim 1, wherein the catalyst coating comprises about two oxygens for each cobalt present in the catalyst coating and the fluorine in the catalyst coating is present as fluoride.

4. The method of claim 1, wherein the substrate further comprises a tin oxide.

5. The method of claim 1, wherein the water has a pH of between 3 and 7.

6. The method of claim 1, wherein a cobalt cation is present in the water at a concentration of between 0.1 and 100 mM.

7. The method of claim 1 wherein a fluoride anion is present in the water at a concentration between 0.1 and 2 M.

* * * * *